United States Patent
Xu et al.

(10) Patent No.: US 12,110,185 B2
(45) Date of Patent: Oct. 8, 2024

(54) ROLLER-TYPE CONVEYING DEVICE FOR FRUIT AND VEGETABLE SORTING

(71) Applicants: ZHEJIANG UNIVERSITY, Hangzhou (CN); Zhejiang Kepler Technology Co., Ltd., Hangzhou (CN)

(72) Inventors: Huirong Xu, Hangzhou (CN); Shuai Wang, Hangzhou (CN); Yibin Ying, Hangzhou (CN)

(73) Assignees: ZHEJIANG UNIVERSITY, Hangzhou (CN); Zhejiang Kepler Technology Co., Ltd., Hangzhou (CN)

( * ) Notice: Subject to any disclaimer, the term of this patent is extended or adjusted under 35 U.S.C. 154(b) by 0 days.

(21) Appl. No.: 17/924,370

(22) PCT Filed: Sep. 8, 2021

(86) PCT No.: PCT/CN2021/117107
§ 371 (c)(1),
(2) Date: Jan. 19, 2023

(87) PCT Pub. No.: WO2023/284096
PCT Pub. Date: Jan. 19, 2023

(65) Prior Publication Data
US 2024/0217747 A1    Jul. 4, 2024

(30) Foreign Application Priority Data

Jul. 14, 2021 (CN) .......................... 202110797640.X

(51) Int. Cl.
| | |
|---|---|
| *B65G 17/16* | (2006.01) |
| *B65G 13/07* | (2006.01) |
| *B65G 17/32* | (2006.01) |
| *B65G 17/38* | (2006.01) |

(52) U.S. Cl.
CPC ............. *B65G 17/16* (2013.01); *B65G 13/07* (2013.01); *B65G 17/32* (2013.01); *B65G 17/38* (2013.01);
(Continued)

(58) Field of Classification Search
CPC ........ B65G 17/16; B65G 13/07; B65G 17/32; B65G 17/38; B65G 2201/0211; B65G 2203/0258; B07C 5/16
See application file for complete search history.

(56) References Cited

U.S. PATENT DOCUMENTS

| | | | |
|---|---|---|---|
| 10,094,701 B2* | 10/2018 | Blanc | .................. B65G 47/962 |
| 2013/0334109 A1* | 12/2013 | Liedl | ........................ B07C 5/16 |
| | | | 209/545 |

FOREIGN PATENT DOCUMENTS

| | | |
|---|---|---|
| CN | 101658843 A | 3/2010 |
| CN | 103480580 A | 1/2014 |

(Continued)

OTHER PUBLICATIONS

CN102292274 (Year: 2011).*
(Continued)

*Primary Examiner* — Gene O Crawford
*Assistant Examiner* — Lester Ill Rushin
(74) *Attorney, Agent, or Firm* — Bayramoglu Law Offices LLC

(57) ABSTRACT

A roller-type conveying device for fruit and vegetable sorting includes a chain assembly and a conveying unit. Fruits and vegetables are placed on the conveying unit. The chain assembly includes a drive chain and a chain support bar, and the drive chain is arranged on the chain support bar. A conveying unit is arranged along a drive chain. The conveying unit includes outer rollers, a roller frame, pin shafts, rubber bushings, a roller shaft, and a support base. The two
(Continued)

outer rollers are fixed coaxially on the two ends of the roller shaft. The roller shaft is equipped with the rubber bushing. The roller shaft is movably fitted into a special-shaped hole slot on the top of the roller frame. The roller shaft is arranged axially perpendicular to the transmission direction of the drive chain. The support base is mounted on the drive chain.

7 Claims, 7 Drawing Sheets

(52) U.S. Cl.
 CPC ............... *B65G 2201/0211* (2013.01); *B65G 2203/0258* (2013.01)

(56) References Cited

FOREIGN PATENT DOCUMENTS

| | | |
|---|---|---|
| CN | 105195440 A | 12/2015 |
| CN | 104014488 B | 6/2016 |
| CN | 210253142 U | 4/2020 |
| DE | 69906517 T2 | 3/2004 |

OTHER PUBLICATIONS

PL223826 (Year: 2016).*
CN111661565 (Year: 2020).*
KR20160040057 (Year: 2016).*

* cited by examiner

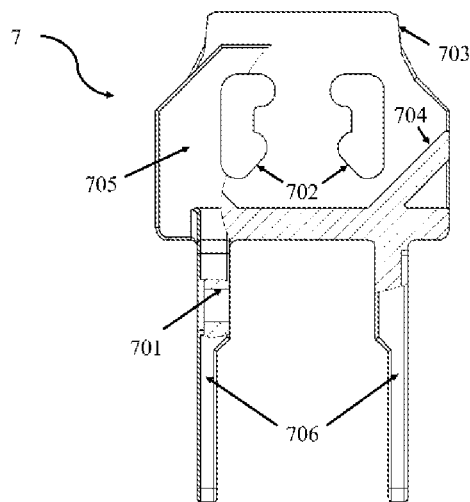
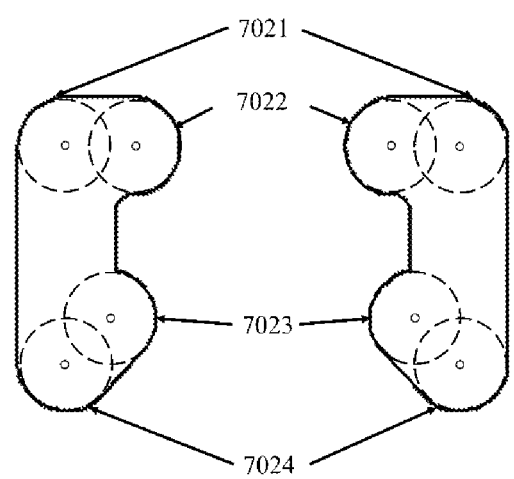
FIG. 5　　　　　　　　　FIG. 6
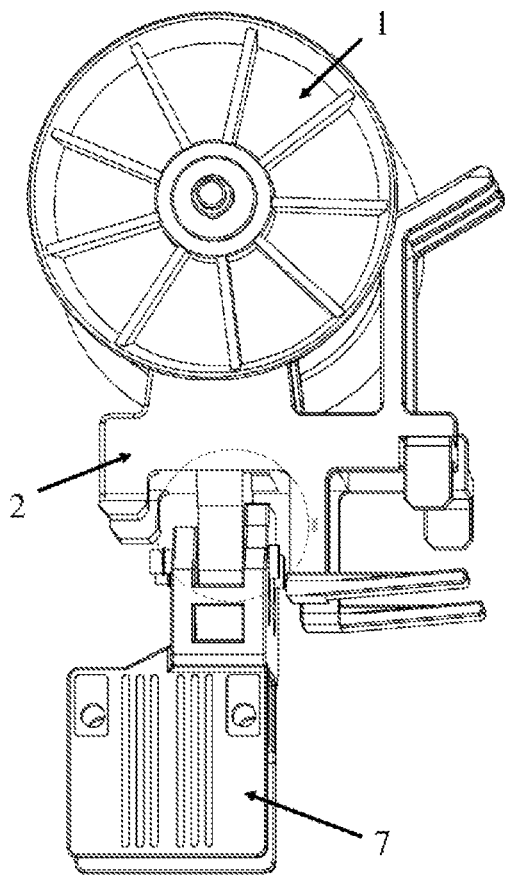
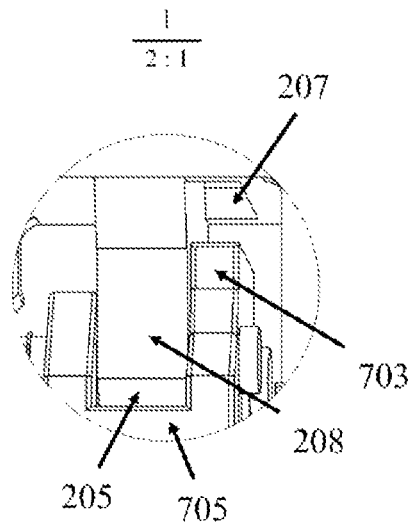
FIG. 7

ROLLER-TYPE CONVEYING DEVICE FOR FRUIT AND VEGETABLE SORTING

CROSS REFERENCE TO THE RELATED APPLICATIONS

This application is the national phase entry of International Application No. PCT/CN2021/117107, filed on Sep. 8, 2021, which is based upon and claims priority to Chinese Patent Application No. 202110797640.X, filed on Jul. 14, 2021, the entire contents of which are incorporated herein by reference.

TECHNICAL FIELD

The present invention relates to a conveying and sorting device for agricultural products in the agricultural machinery field, in particular, to a roller type conveying device for fruit and vegetable sorting.

BACKGROUND

China is the largest producer of fruits and vegetables and the largest production base of fruit and vegetable products worldwide. In China, the annual output of fruits and vegetables is about 1 billion tons, and the value of related industries exceeds 3 trillion yuan. Harvested fruits and vegetables must undergo commodification before entering the market, and the commodification includes sorting, packaging, transporting, storing and processing, and other steps. Among these steps, the quality detection and sorting step of fruits and vegetables is crucial, in which the fruits and vegetables are sorted in real-time according to the weight, size, sweetness, and surface defects of the fruits and vegetables to eliminate defective products from the source and improve the added value of fruit and vegetable products. Therefore, it is particularly important to develop a fruit conveying mechanism for intelligent sorting of fruit and vegetable based on quality.

In the existing research and industrial applications, roller-type fruit conveyers are typically used to convey and sort fruits and vegetables, but some common roller-type conveying fruit devices only have limited functions such as conveying, rolling and unloading, which cannot meet the needs of diversity. Although some multi-functional conveying fruit devices are developed, they usually have a complex structure and a large number of parts, leading to high precision requirements for assembling, which may easily lead to undesirable interferences or friction among the parts that may cause damage to the devices when used. In addition, some fruit conveyers usually use a spring for traction, an electromagnet for adsorption, or other elements to assist in resetting the conveyer after completing unloading and sorting, which makes the overall structure of the fruit conveyers complicated, more expensive to maintain and unreliable.

Chinese Patent No. CN104014488 B proposes a fruit conveying mechanism and fruit treatment system for fruit non-destructive inspection and weighing and unloading, mainly including a support base, claw toggles, and rollers. In the fruit unloading station, the claw toggles turn up around the floating hinge assembly so that the fruit can be unloaded. The shortcoming of the patent is that such a hinge structure is only able to turn from one side of the claw toggles, which diminishes the operational flexibility and performance of the conveying device. With the same number of sorting outlets, this structure results in an increase in the length of the production line length as well as the occupied area.

US Patent No. US2013/0334109 A1 proposes a production line for sorting agricultural products, including a first conveying section and a second conveying section. The first conveying section includes trays that are continuously distributed from the loading section to the unloading section for conveying agricultural products forward. The second conveying section includes rollers mounted in between the trays to roll over the product. The patent divides the production line into multiple sections, each of which is driven separately and has a different structure for different functions. This multi-section conveying mechanism makes the structure of the production line complex and it is expensive to install and maintain the multi-section conveying mechanism.

SUMMARY

In order to solve the problems existing in the prior art, the present invention provides a roller-type conveying device for fruit and vegetable sorting, which contains only a small number of parts with a simple fitting and connection mechanism among the parts, and can realize the functions of conveying, rolling, weighing and unloading of fruits and vegetables, as well as the automatic resetting of the conveying device.

The technical solutions of the present invention are as follows.

The roller-type conveying device includes a chain assembly and conveying units on which the fruits and vegetables are placed.

The chain assembly includes a drive chain and a chain support bar. The drive chain is arranged on the chain support bar, and the chain support bar is mounted below the drive chain and in contact with the drive chain to play a supporting role. The conveying units are mounted on each chain link along the drive chain.

Each conveying unit includes outer rollers, roller frames, pin shafts, rubber bushings, a roller shaft, and a support base. Two outer rollers are fixed coaxially on the two ends of the roller shaft. The roller shaft is equipped with the rubber bushings outside, the roller shaft is movably arranged in a special-shaped hole slot on the top of the roller frame, and the roller shaft is arranged axially perpendicular to the transmission direction of the drive chain. The bottom of the roller frame is movably connected to the top of the support base through the pin shafts and the special-shaped hole slot. The support base is mounted on the drive chain.

The fruits and vegetables of the present invention are sphere-like fruits and vegetables, such as potatoes, citrus, and apples.

The main body of the roller frame is a U-shaped frame composed of a bottom plate located in the middle and two vertical plates connected on two sides of the bottom plate. The vertical plates on the two sides are provided with roller shaft sliding slots on the upper side along the transmission direction of the drive chain. The roller shaft sliding slots are vertical kidney-shaped slots in the length direction. The roller shaft is movably arranged and moves up and down within the two roller shaft sliding slots on two sides of the vertical plate. A support claw is connected between the two vertical plates along the moving direction of the drive chain, and the support claw is arranged obliquely upward from the middle of the vertical plates along the transmission direction of the drive chain. The fruits and vegetables are placed in a recessed portion formed between the support claw and the vertical plates, and the fruits and vegetables are supported by the support claw and the middle of the roller shaft. The bottom surface of the bottom plate of the roller frame is fixed with the rectangular base connection portion. The base connection portion has the two pin shaft mounting holes, which are symmetrically arranged, and a pin shaft is mounted in each pin shaft mounting hole.

The support base is mainly composed of two parts: a chain base located in the lower part and a roller frame base located in the upper part. The chain base is connected to the drive chain.

The roller frame base includes two side plates arranged oppositely along the transmission direction of the drive chain. A pin shaft sliding slot set is set on one side of the two side plates, and another pin shaft sliding slot set is set on the other side of the two side plates. Each pin shaft sliding slot set includes two pin shaft sliding slots with special-shaped holes on the two side plates respectively. The two pin shaft sliding slots are arranged along the same transmission direction of the drive chain, and the two pin shaft sliding slots are symmetrically arranged on each side plate. A rectangular mounting slot is formed between the two side plates, so that the rectangular base connection portion is embedded in the mounting slot. The pin shafts inside the two pin shaft mounting holes on the base connection portion pass through one pin shaft sliding slot set, and the pin shafts pass through the two pin shaft sliding slots in the pin shaft sliding slot sets, so that the bottom of the roller frame is movably connected to the top of the support base, and then the roller frame and the support base are adjusted to form different postures to achieve different working states.

The two sides of the base connection portion of the roller frame are symmetrically provided with two limit bevels having chamfered structures. The two limit bevels on each side are divided into a limit bevel I and a limit bevel II arranged from bottom to top. The bottom of the mounting slot between the two side plates of the roller frame base is equipped with the limit bevel III that tilts upward and outward. The limit bevel III is used to cooperate with the limit bevel I and limit bevel II on the roller frame to play a limiting role.

At least one side plate of the two side plates of the roller frame base protrudes upward in the direction of the drive chain to form the limit protrusion. The bottom surface of the bottom plate of the roller frame above the limit protrusion is provided with the limit slot. The limit protrusion is embedded into the limit slot to cooperate with the limit slot, ensuring that the roller frame in conveying process are stable and will not roll over laterally.

Weighing points are arranged at all four corners of the bottom plate of the roller frame. The weighing points are divided into two outer weighing points and two inner weighing points. The two outer weighing points are arranged on two sides of the bottom plate of the roller frame near the lower side of the transmission direction of the drive chain, and the two inner weighing points are also arranged on the two sides of the bottom plate of the roller frame near the upper side of the transmission direction of the drive chain.

Two outer sides of the bottom plate of the roller frame are provided with a sorting toggle bar. The sorting toggle bar can be driven to drive the roller frame to tilt and unload the fruits and vegetables.

The roller shaft includes central rollers, conical mounting blocks, and a rotating shaft. The central rollers are fixed coaxially in the middle of the rotating shaft, and the central rollers are equipped with the rubber bushings outside. The conical mounting blocks are coaxially fastened to the two ends of the roller shaft. An interference fit is formed between the conical mounting block and the conical mounting holes of the outer rollers. Parts of the rotating shaft on two sides of the central rollers are arranged in the two roller shaft sliding slots of the roller frame, and the rotating shaft can move up and down in the roller shaft sliding slots.

The shape of the single pin shaft sliding slot is special-shaped, and the main body of the pin shaft sliding slot is a vertical straight bar-shaped slot. The top of the bar-shaped slot is provided with an upper circular hole on the side near the center of the side plate, and the top of the bar-shaped slot is connected to the upper circular hole. The bottom of the bar-shaped slot is provided with a lower circular hole on the side near the center of the side plate, and the bottom of the slot is connected to the lower circular hole. The width of the bar-shaped slot, the diameter of the upper circular hole, and the diameter of the lower circular hole are identical to the diameter of the pin shafts, so that the pin shafts can move up and down along the bar-shaped slot, and can move into the upper circular hole through the top of the bar-shaped slot and into the lower circular hole through the bottom of the bar-shaped slot.

On the same side plate, the distance between the centers of the circles at the top of the bar-shaped slots of the pin shaft sliding slots on the two sides, the distance between the centers of the circles at the bottom of the bar-shaped slots of the pin shaft sliding slots on the two sides, the distance between the center of the circle of the upper circular hole of the pin shaft sliding slot on one side and the center of the circle at the bottom of the bar-shaped slot of the pin shaft sliding slot on the other side, and the distance between the center of the circle at the top of the bar-shaped slot of the pin shaft sliding slot on one side and the center of the circle of the lower circular hole of the pin shaft sliding slot on the other side are identical and equal to the distance between the two pin shaft mounting holes on the base connection portion.

The chain support bar of the chain assembly is divided into four working areas including a production line loading section, a production line detecting section, a production line weighing section, and a production line sorting section sequentially arranged along the transmission direction of the drive chain.

Two sides of the drive chain are always provided with the frame.

A detection dark box is set at the production line detecting section. A detecting section support guiding rail is provided on each of the two sides of the drive chain. The detecting section support guiding rails are fixed to the frame. The detecting section support guiding rail on both sides are located under the outer rollers connected to two ends of the roller shaft. The detecting section support guiding rails, the drive chain at the production line detecting section and each conveying unit are located in the detection dark box.

At the production line weighing section, a weighing section support guiding rail is provided on each of the two sides of the drive chain. The weighing section support guiding rails are fixed to the frame. The weighing section support guiding rails on both sides are located below the weighing points on two sides of the roller frame. Load cells are arranged on the weighing section support guiding rail, and the load cells work in contact with the weighing points of the roller frame in the conveying unit.

At the production line sorting section, an electromagnetic toggle bar assembly is provided on each of two sides of the drive chain. The electromagnetic toggle bar assembly makes contact with the sorting toggle bar to push the sorting toggle bar. Flexible rollers and sorting outlets are provided below the drive chain. The sorting outlets are located below the flexible rollers. The flexible rollers are coaxially connected to the flexible roller drive motor.

The load cell is a strip-shaped sensor arranged along the direction of the weighing section support guiding rail.

The present invention can realize the functions of conveying, rolling, weighing, and unloading the fruits and vegetables. The conveying units support the fruits and vegetables by means of the outer roller, the central roller, and the support claw. Multiple limit bevels, limit protrusions and limiting slots cooperate with each other to achieve a position limiting function, which ensures the stable operation of the conveying unit. Four staggered inner and outer weighing points are configured to realize the weighing process of the fruits and vegetables. The sorting toggle bar is configured to tilt the whole device to unload the fruits and vegetables. In addition, the pin shafts on both sides jointly move in the pin shaft sliding slot to achieve the lifting, turning and resetting of the roller frame and roller shaft.

The present invention can be used for conveying, detecting, weighing, and sorting fruits and vegetables such as potatoes, oranges, and apples, while effectively avoiding damage to fruits and vegetables.

The present invention has the following advantages.

The conveying unit proposed in the present invention can realize the functions of conveying, rolling, weighing and unloading of fruits and vegetables, such as potatoes, oranges, and apples, as well as the automatically resetting of the conveying unit. The conveying unit has a small number of parts, a compact size, a simple structure and a simple connecting mechanism, thereby achieving convenient installation and easy maintenance. The conveying unit carries fruits and vegetables through the outer rollers, central rollers, and curved support claws, in which the multi-point contact bearing method is adaptable to different sizes and types of fruits and vegetables, and can place fruits and vegetables stably to avoid bumping and damage. The conveying unit can effectively avoid tilting and other failures in the conveying process through the cooperation of limit protrusions, limit slots, and limit bevel to ensure the stable conveying of fruits and vegetables. The conveying unit can realize turning and unloading laterally through the synergistic movement of the two pin shafts in the symmetrically arranged pin shaft sliding slots, which increases the numbers of sorting outlets, or shortens the length of the production line in case of the same number of sorting ports, and improve the flexibility and performance of the production line. The conveying unit adopts four staggered internal and external weighing points to effectively ensure the weighing accuracy and reliability. The portions of the conveying unit in contact with fruits and vegetables are made of flexible materials such as food-grade rubber, which can effectively avoid damage to fruits and vegetables.

BRIEF DESCRIPTION OF THE DRAWINGS

FIG. 5 is an axonometric view of a support base.
FIG. 6 is a schematic diagram showing the structure of a pin shaft sliding groove on a roller frame base.
FIG. 7 is a partially enlarged schematic diagram of a roller-type conveying device.

In the figures: 1, outer roller; 2, roller frame; 3, pin shaft; 4, rubber bushing; 5, roller shaft; 6, clamping spring; 7, support base; 8, chain pin shaft; 9, drive chain; 10, flexible roller drive motor; 11, production line loading section; 12, production line detecting section; 13, production line weighing section; 14, production line sorting section; 15, sprocket; 16, chain support bar; 17, fruits and vegetables/potatoes; 18, detection dark box; 19, detecting section support guiding rail; 20, load cell; 21, weighing section support guiding rail; 22, flexible roller; 23, electromagnetic toggle assembly; 24, sorting outlet; 25, frame;

201, outer weighing point; 202, inner weighing point; 203, sorting toggle bar; 204, pin shaft mounting hole; 205, limit bevel I; 206, support claw; 207, limit slot; 208, limit bevel II; 209, roller shaft sliding slot; 210, base connection portion.

501, central roller; 502, conical mounting block; 503, rotating shaft.

701, chain pin shaft mounting hole; 702, pin shaft sliding slot; 703, limit protrusion; 704, limit bevel III; 705, roller frame base; 706, chain base.

7021, top outer point; 7022, top inner point; 7023, bottom inner point; 7024, bottom outer point.

DETAILED DESCRIPTION OF THE EMBODIMENTS

The following is a further detailed description of specific implementations of the present invention, taking the sorting of potatoes as an example, in conjunction with the drawings and specific embodiments. The following embodiments are used to illustrate the invention, but are not intended to limit the scope of the invention.

Figure 1:
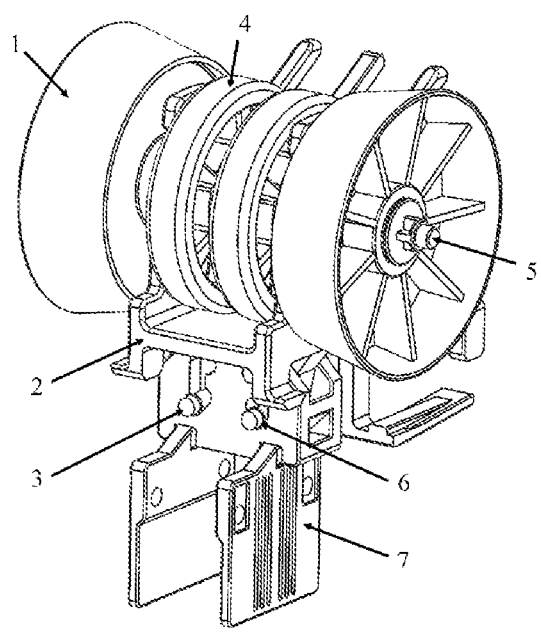
FIG. 1 is an axonometric view of a conveying unit.
Figure 2:
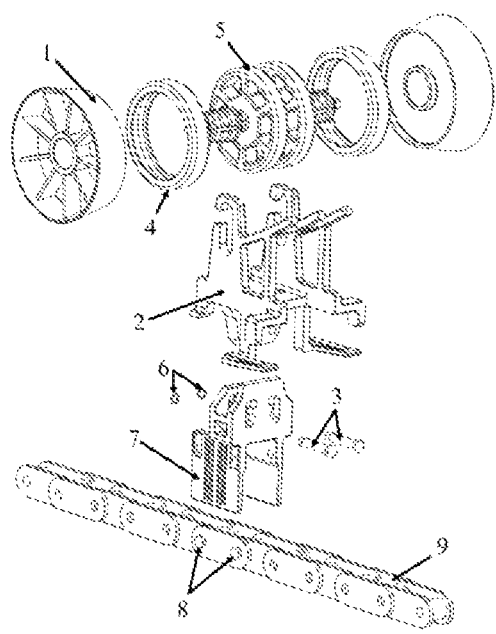
FIG. 2 is an exploded view of the conveying unit.

As shown in FIG. 1 and FIG. 2, the present invitation includes a chain assembly and a conveying unit. The fruits and vegetables 17 are placed on the conveying unit.

The chain assembly includes the drive chain 9 and the chain support bar 16. The chain support bar 16 is mounted on the frame 25. The chain support bar 16 is located below the drive chain 9 and in contact with the drive chain 9 to support it. The conveying units are mounted on each chain link along the drive chain 9, and the conveying units are arranged at a distance along the direction of the drive chain 9.

Each conveying unit includes the outer rollers 1, the roller frame 2, the pin shafts 3, the rubber bushings 4, the roller shaft 5, and the support base 7. The two outer rollers 1 are fixed coaxially on two ends of the roller shaft 5. The central roller 501 of the roller shaft 5 is equipped with the annular rubber bushings 4 for cushioning. The roller shaft 5 is movably set in the special-shaped hole slot at the top of the roller frame 2. The roller shaft 5 is arranged axially perpendicular to the transmission direction of the drive chain 9. The bottom of the roller frame 2 is movably connected to the top of the support base 7 through the pin shaft 3 and the pin shaft sliding slot 702 of the special-shaped hole slot. The support base 7 is mounted on the drive chain 9.

Figure 3:
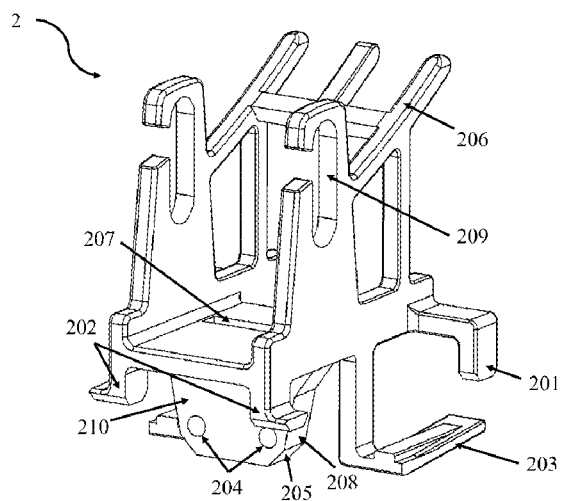
FIG. 3 is an axonometric view of a roller frame.

As shown in FIG. 3, the main body of the roller frame 2 is a U-shaped frame composed of a bottom plate located in the middle and vertical plates connected on both sides of the bottom plate. The vertical plates on both sides are parallel to the roller shaft 5, and the vertical plates on both sides are provided with roller shaft sliding slots 209 on the upper side along the transmission direction of the drive chain 9. The two roller shaft sliding slots 209 of the vertical plates on both sides are arranged symmetrically. The roller shaft sliding slots 209 are vertical elongated oval-shaped slots along the length direction perpendicular to drive chain 9. The roller shaft 5 is movably arranged and can move up and down in the two roller shaft sliding slots 209 in the vertical plates on both sides. The roller shaft sliding slots 209 provides a traveling space for the up-down movement of the roller shaft 5. One side of the roller shaft sliding slot 209 is provided with a mounting gap for the insertion of the roller shaft 5 so that the roller shat 5 is easily mounted and not easily detached.

The roller frame 2 is provided with the support claw 206 and a base connection portion 210.

Figure 13:
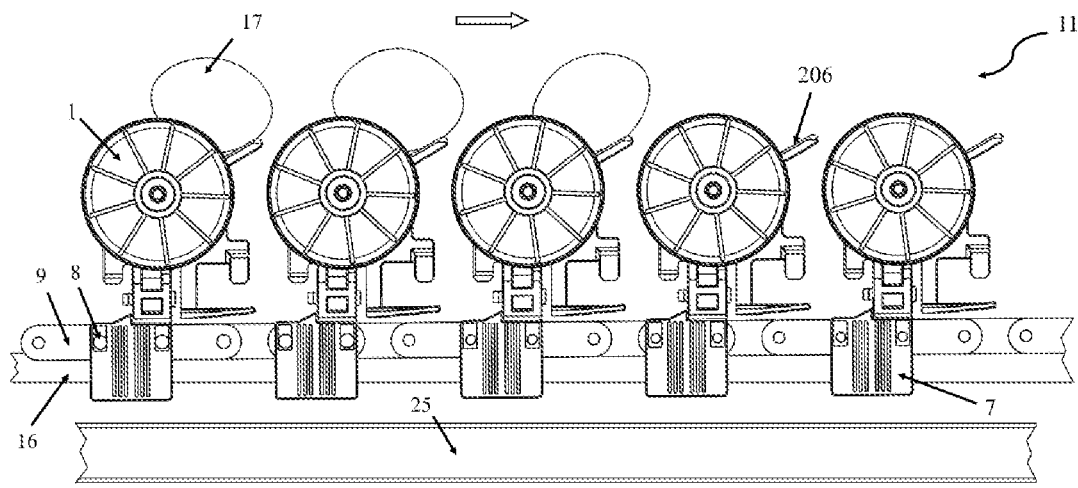
FIG. 13 is a front view of a production line loading section according to the embodiment of the present invention.
Figure 15:
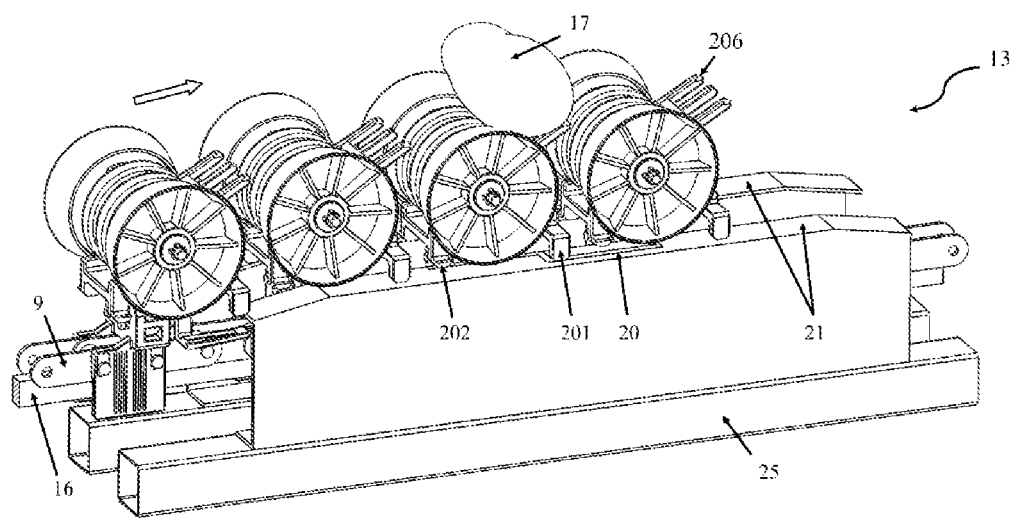
FIG. 15 is an axonometric view of a production line weighing section according to the embodiment of the present invention.

The support claw 206 is connected between the two vertical plates along with the moving direction of the drive chain 9. The support claw 206 is arranged upward obliquely from the middle of the vertical plate in the direction of transmission along the drive chain 9. The fruits and vegetables 17 are placed in a recessed portion formed between the support claw 206 and the vertical plates. The fruits and vegetables 17 are supported by the support claw 206 and the middle of the roller shaft 5. The support claw 206 plays the role of supporting the fruits and vegetables 17. In the loading and weighing processes, the support claw 206, the outer roller 1 and the central roller 501 jointly support the fruits and vegetables 17, as shown in FIG. 13 and FIG. 15.

The bottom surface of the bottom plate of the roller frame 2 is fixed with the rectangular base connection portion 210. The base connection portion 210 has the two pin shaft mounting holes 204. The two pin shaft mounting holes are symmetrical. The pin shaft 3 is mounted in each pin shaft mounting hole 204. The end of the pin shaft 3 is fitted with the clamping spring 6 so that the pin shaft 3 is axially limited in the pin shaft mounting hole 204.

As shown in FIG. 5, the support base 7 is mainly composed of two parts: the chain base 706 located in the lower part, and the roller frame base 705 located in the upper part. The chain base 706 is connected to the drive chain 9.

The chain pin shaft mounting hole 701 is arranged on two sides of the chain base 706. The distance between the centers of the two chain pin shaft mounting holes 701 and the distance between the two chain pin shafts 8 on each section of the drive chain 9 is identical. The chain pin shafts 8 of the drive chain 9 enter the chain pin shaft mounting holes 701 on the chain base 706 so that the chain base 706 is fixed to the drive chain 9, thereby ensuring that the support base 7 is fixed to the drive chain 9.

The roller frame base 705 includes two side plates arranged oppositely along the transmission direction of the drive chain 9. The direction of the two side plates of the roller frame base 705 is perpendicular to the drive chain 9. A pin shaft sliding slot set is set on one side of the two side plates, another pin shaft sliding slot set is set on the other side of the two side plates. Each pin shaft sliding slot set includes two pin shaft sliding slots 702 on the two side plates respectively. The two pin shaft sliding slots 702 are special-shaped and arranged along the same transmission direction of the drive chain 9. The two pin shaft sliding slot sets are symmetrically arranged on the two side plates. The two pin shaft sliding slots 702 on each side plate are symmetrically arranged. A rectangular mounting slot is formed between the two side plates. The shape and size of the mounting slot correspond with the shape and size of the base connection portion 210 so that the rectangular base connection portion 210 is embedded in the mounting slot. A pin shafts 3 inside each of the two pin shaft mounting holes 204 on the base connection portion 210 passes through one pin shaft sliding slot set. The pin shafts 3 respectively passes through two pin shaft sliding slots 702 in the pin shaft sliding slot sets, so that the bottom of the roller frame 2 is movably connected to the top of the support base 7, and then the roller frame 2 and the support base 7 are adjusted to form different postures to achieve different working states.

Figure 10:
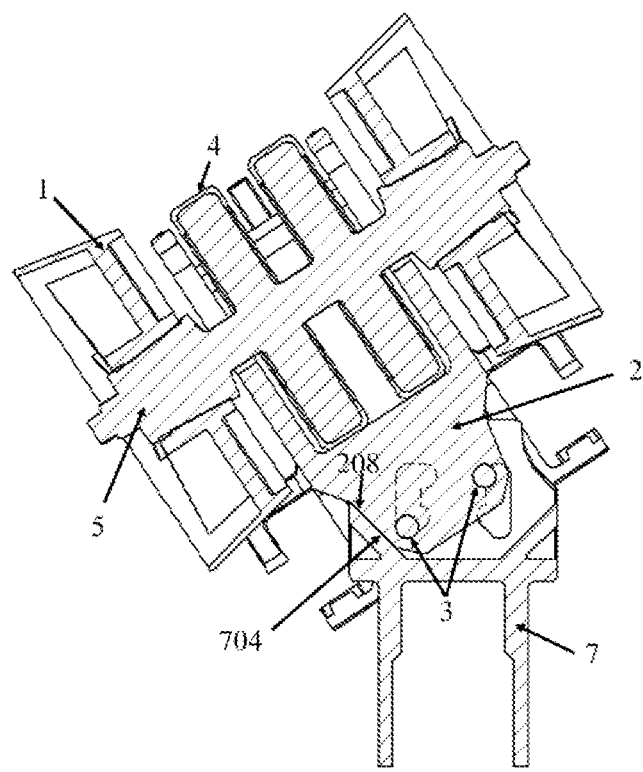
FIG. 10 is a schematic diagram showing the position of the conveying unit at the end of unloading.

The two sides of the base connection portion 210 of the roller frame 2 are symmetrically provided with two limit bevels with chamfered structures. The two limit bevels on each side are a limit bevel I 205 and a limit bevel II 208 arranged from the bottom to top so that the side and bottom surfaces of the base connection portion 210 are connected by the two chamfered limit bevels. The bottom of the mounting slot between the two side plates of the roller frame base 705 is equipped with the limit bevel III 704 that tilts upward and outward. The limit bevel III 704 is used to cooperate with the limit bevel I 205 and the limit bevel II 208 on the roller frame 2 to play a role in limiting the position of the roller frame, as shown in FIG. 8 and FIG. 10.

Figure 8:
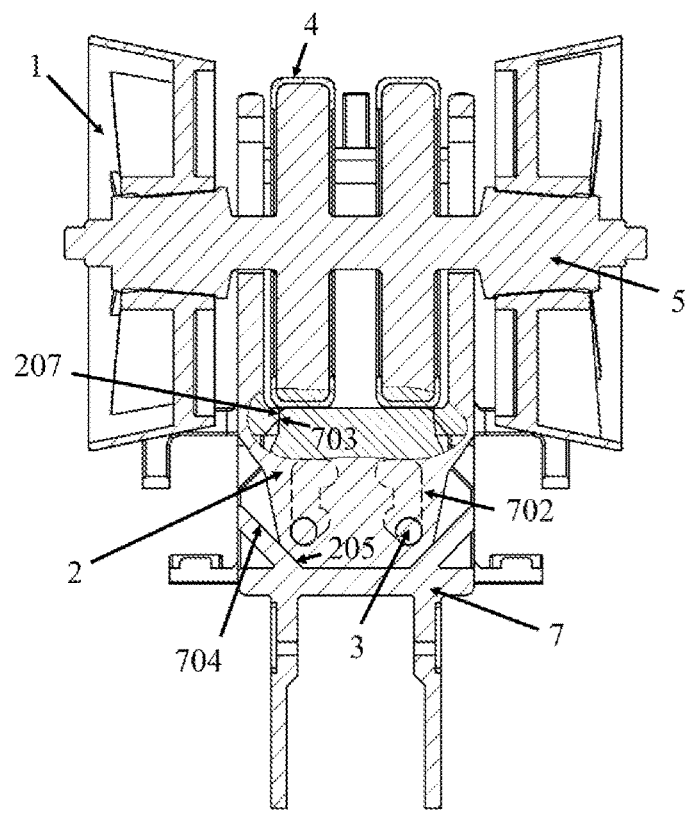
FIG. 8 is a schematic diagram showing the initial position of the conveying unit.

As shown in FIG. 5 and FIG. 8, at least one side plate of the two side plates of the roller frame base 705 protrudes upward in the direction of the drive chain 9 to form the limit protrusion 703, so that the heights of the two side plates of the roller frame base 705 is not identical, and the height of the side plate with the limit protrusion 703 is higher than the height of the side plate without the limit protrusion 703. The bottom surface of the bottom plate of the roller frame 2 above the limit protrusion 703 is provided with the limit slot 207. The limit slot 207 is adjacent to the base connection portion 210. The two sides of the opening of the limit slot 207 are trapezoid-shaped and fit with the limit protrusion 703. The limit protrusion 703 cooperate with and is embedded into the limit slot 207, to position and support the roller frame 2 of the conveying unit when the conveying unit is in the loading section and the detecting section, which ensures the stable transmission of the roller frame 2, as shown in FIG. 8.

As shown in FIG. 3, the weighing points for weighing and pressing are arranged at four corners of the bottom plate of the roller frame 2, and the weighing points are arranged by horizontally extended support arms. The weighing points are divided into two outer weighing points 201 and two inner weighing points 202. The two outer weighing points 201 are arranged on both sides of the bottom plate of the roller frame 2 near the lower side of the transmission direction of the drive chain 9, and the two inner weighing points 202 are also arranged on both sides of the bottom plate of the roller frame 2 near the upper side of the transmission direction of the drive chain 9. The outer weighing points 201 and the inner weighing points 202 are symmetrically arranged on both sides. In the weighing process, the four weighing points collectively press and act on the load cell 20, and are configured to prolong the weighing travel on the load cell 20. The spacing between the weighing points on both sides of the roller frame 2 is smaller than the spacing between the two outer rollers 1 connected to the two ends of the roller shaft 5, so that the two outer rollers 1 are supported by the detecting section support guiding rail 19 with greater spacing on both sides, and the weighing points on both sides of the roller frame 2 are supported by the production line weighing section 13 with smaller spacing on both sides, forming staggered support.

As shown in FIG. 3, the two outer sides of the bottom plate of the roller frame 2 are provided with the sorting toggle bar 203 in contact with the electromagnetic toggle assembly 23. The sorting toggle bar 203 is driven to drive the tilt of the roller frame 2 to unload the fruits and vegetables. The sorting toggle bar 203 protrudes from the middle portion of the two outer sides of the bottom plate of the roller frame 2. In the sorting process, the electromagnetic toggle assembly 23 toggles the sorting toggle bar 203 to make the roller frame 2 tilt and thus make the whole conveying unit tilt, so that the unloading of fruits and vegetables can be achieved.

The sorting toggle bar 203 is arranged at a height lower than the weighing points so that the weighing section support guiding rail 21 in the production line weighing section 13 can pass between the sorting toggle bar 203 and the weighing points.

Figure 4:
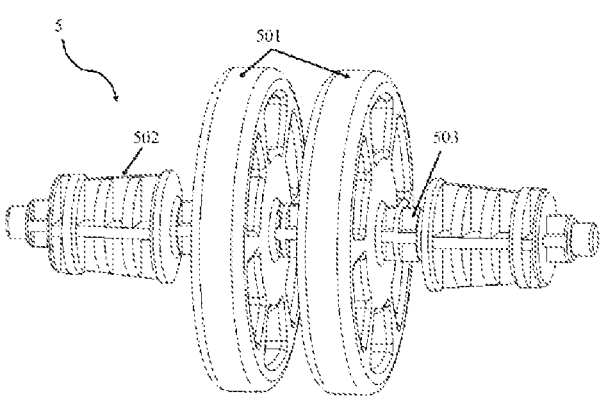
FIG. 4 is an axonometric view of a roller shaft.

As shown in FIG. 4, the roller shaft 5 includes the central rollers 501, the conical mounting blocks 502, and the rotating shaft 503. At least one central roller 501 is fixed coaxially in the middle center of the rotating shaft 503. The central roller 501 is integrally formed with the rotating shaft 503. The central roller 501 is equipped with the rubber bushing 4 outside. The rubber bushing 4 is used to provide cushioning when the central roller 501 is in contact with the surface of the fruits and vegetables 17, such that the rubber bushing 4 has the functions of supporting the fruits and vegetables and reducing damage to the fruits and vegetables, as shown in FIG. 1. The conical mounting blocks 502 are coaxially fastened to both ends of the roller shaft 5. An interference fit is formed between the conical mounting blocks 502 and the conical mounting holes of the outer rollers 1, so that the conical mounting blocks 502 are coaxially fastened to the outer rollers 1. The end of the conical mounting block 502 has a protrusion for preventing the outer roller 1 from falling off. Portions of the rotating shaft 503 between the conical mounting blocks 502 and two sides of the central roller 501 are arranged in the two roller shaft sliding slots 209 of the roller frame 2, so that the rotating shaft 503 can move up and down in the roller shaft sliding slots 209, and drives the roller shaft 5 up and down as a whole.

The outer roller 1 is made of rubber. The outer circumference of the outer roller 1 is conical. The outer roller 1, the central roller 501 and the support claw 206 jointly support the potatoes 17, as shown in FIG. 1. The conical mounting block 502 and the circumferential surface of the rotating shaft 503 are hollowed out to reduce weight and friction, facilitating the installation of the outer roller 1 and the movements of the rotating shaft 503 in the roller shaft sliding slot 209.

The conveying unit of the present invention has an overall left-right symmetrical structure. The roller frame 2, the roller shaft 5 and the support base 7 all have a left-right symmetrical structure, which can realize two-sided turning and sorting.

Figure 9:
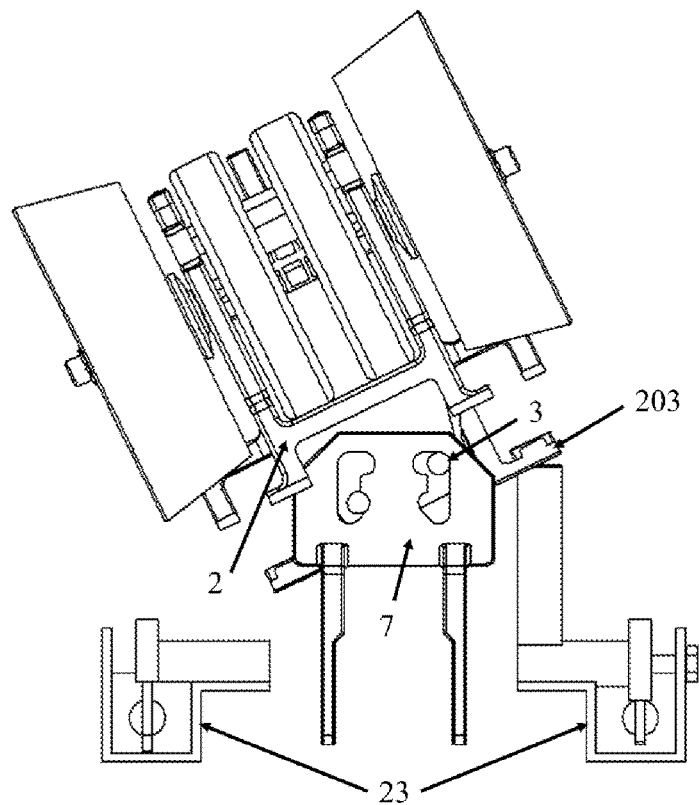
FIG. 9 is a schematic diagram showing the position of the conveying unit during unloading.

As shown in FIG. 6, the shape of the single pin shaft sliding slot 702 is a special-shaped hole. The main body of the pin shaft sliding slot 702 is a straight bar-shaped slot vertically arranged. The upper and lower ends of the bar-shaped slot are rounded to form a semicircular arc at both ends. The top of the bar-shaped slot is provided with an upper circular hole on the side near the center of the side plate, and the top of the bar-shaped slot and the upper circular hole are connected. The bottom of the bar-shaped slot is provided with a lower circular hole on the side near the center of the side plate, and the bottom of the bar-shaped slot and the lower circular hole are connected. The width of the bar-shaped slot, the diameter of the upper circular hole, and the diameter of the lower circular hole are all the same as the diameter of the pin shaft 3, so that the pin shaft 3 can move up and down along the bar-shaped slot, and can move into the upper circular hole through the top of the bar-shaped slot and into the lower circular hole through the bottom of the bar-shaped slot. The pin shaft sliding slot 702 limits and supports the pin shaft 3 during the turning of the roller frame 2, as shown in FIG. 9 and FIG. 10.

When the pin shaft 3 is located at the top of the bar-shaped slot, the pin shaft 3 is at the top outer point 7021. When the pin shaft 3 is located at the bottom of the bar-shaped slot, the pin shaft 3 is at the bottom outer point 7024. When the pin shaft 3 is located at the upper circular hole, the pin shaft 3 is at the top inner point 7022. When the pin shaft 3 is located at the lower circular hole, the pin shaft 3 is at the bottom inner point 7023.

On the same side plate, the distance between the centers of the circles at the tops of the bar-shaped slots of the pin shaft sliding slots 702 on both sides, the distance between the centers of the circles at the bottoms of the bar-shaped slots of the pin shaft sliding slots 702 on both sides, the distance between the center of the circle of the upper circular hole of the pin shaft sliding slot 702 on one side and the center of the circle at the bottom of the bar-shaped slot of the pin shaft sliding slot 702 on the other side, and the distance between the center of the circle at the top of the bar-shaped slot of the pin shaft sliding slot 702 on one side and the center of the circle of the lower circular hole of the pin shaft sliding slot 702 on the other side are identical and equal to the distance between the two pin shaft mounting holes 204 on the base connection portion 210.

The pin shaft 3 is arranged in the pin shaft mounting hole 204 and the pin shaft sliding slot 702, and can reciprocate in the pin shaft sliding slot 702. The distance between the pin shafts 3 at the two sides is determined, and the relative postures and working status of lifting, turning, and resetting between the roller frame 2 and the roller shaft 5 can be realized through the synergistic movement of the pin shafts 3 at the two sides.

Figure 12:
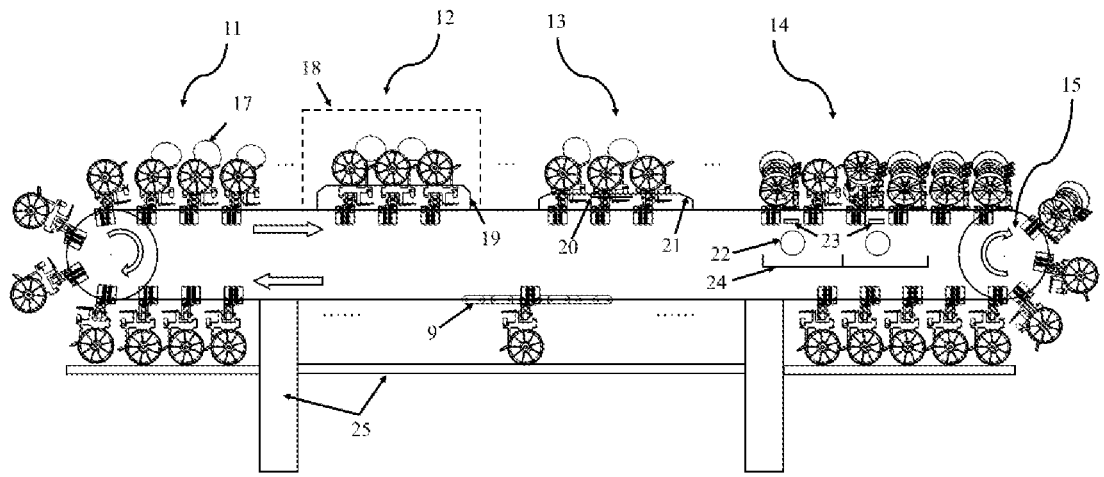
FIG. 12 is a schematic diagram showing an embodiment of a sorting production line according to the present invention.

As shown in FIG. 12, the chain support bar 16 of the chain assembly is divided into four working areas including the production line loading section 11, the production line detecting section 12, the production line weighing section 13, and the production line sorting section 14 that are sequentially arranged along the transmission direction of the drive chain 9 and respectively achieve the loading, detection, weighing and sorting of the potatoes 17.

The main components in the production line include the sprockets 15, the conveying unit, the detection dark box 18, the detecting section support guiding rail 19, the load cell 20, the weighing section support guiding rail 21, the electromagnetic toggle assembly 23, the sorting outlet 24, and the frame 25.

Figure 14:
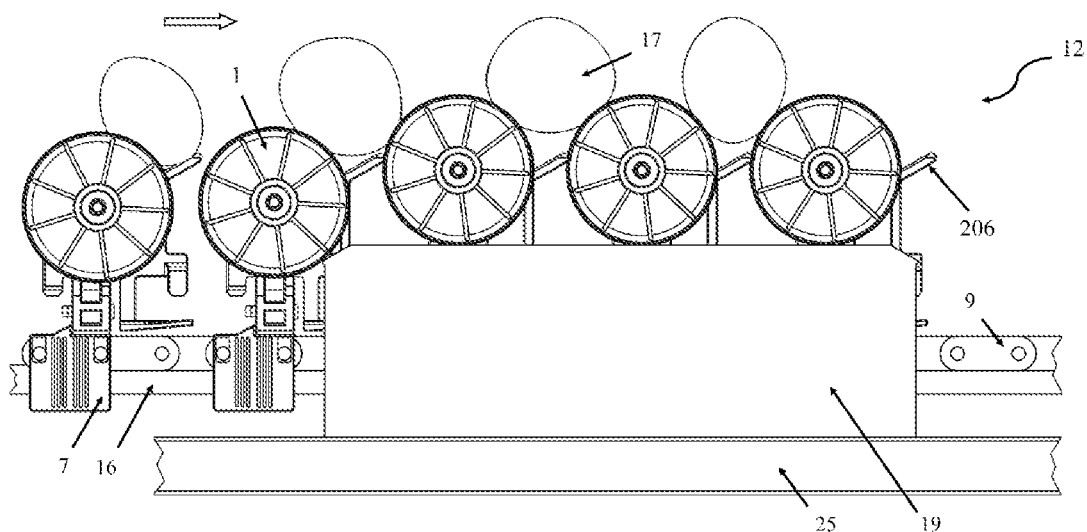
FIG. 14 is a front view of a production line detecting section according to the embodiment of the present invention.
Figure 16:
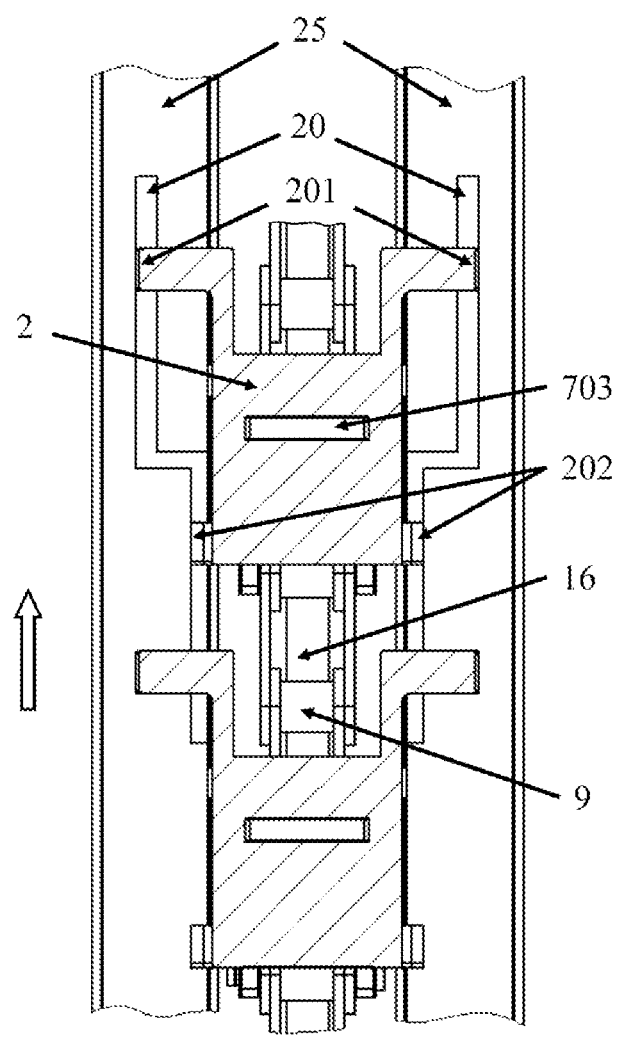
FIG. 16 is a top sectional view of a production line weighing section according to the embodiment of the present invention.
Figure 17:
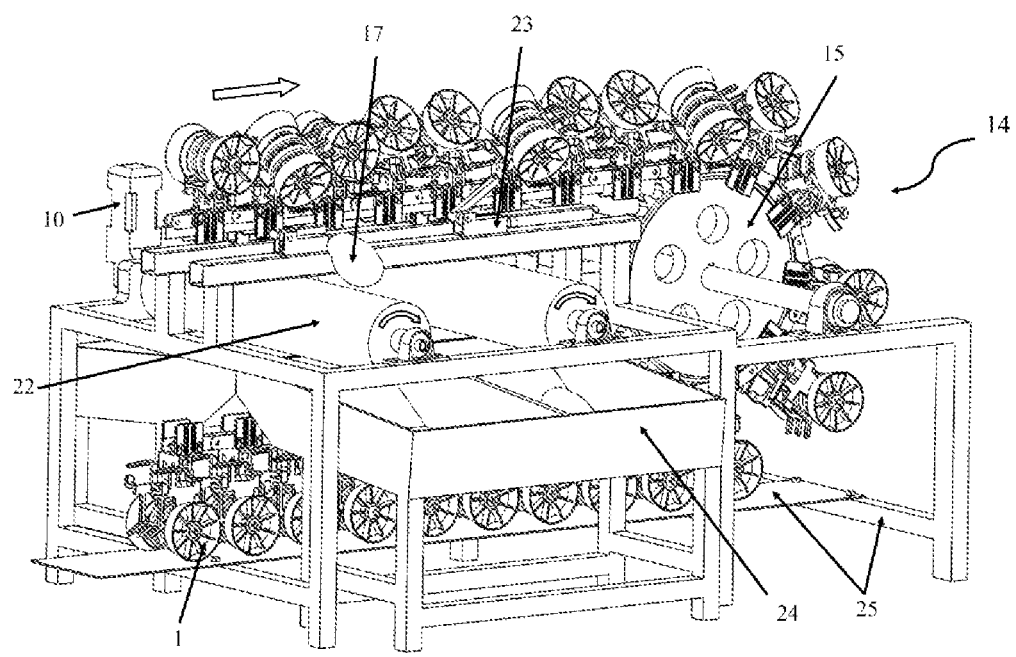
FIG. 17 is an axonometric view of a production line sorting section according to the embodiment of the present invention.

The conveying unit engages with the drive chain 9 through the chain base 706 on the support base 7. The pin shaft 8 of the drive chain 9 is inserted into the chain-pin shaft mounting hole 701 on the chain base 706. The conveying units are spaced at a certain distance. The drive chain 9 cooperates with the sprocket 15 and the motor to drive the whole production line. The chain support bar 16 is bolted to the frame 25. The chain support bar 16 is located below the drive chain 9 and in contact with the chain to support the drive chain 9. The detecting section support guiding rail 19 and the weighing section support guiding rail 21 are mounted on both sides of the conveying unit in the production line and are bolted to the frame 25 respectively. The cross-sectional shape of the two support guiding rails is channel-shaped, and both ends of the two support guiding rails have a sloping structure to facilitate the entry of the conveying unit and play a role in stably supporting fruits and vegetables. The detecting section support guiding rail 19 is in contact with the outer roller 1 of the conveying unit in the production line detecting section 12 to lift the outer roller 1, roller shaft 5, and the potatoes 17 to a certain height. The outer roller 1 and roller shaft 5 are rotated by friction, thus driving the potatoes 17 to rotate, as shown in FIG. 14. The detection dark box 18 is located in the production line detecting section 12, and fixed on the frame 25 by bolts. The detection dark box 18 is equipped with a camera or a spectral detection probe for non-destructive testing such as machine vision or spectral acquisition during the rotation of potatoes 17. The weighing section support guiding rail 21 is in contact with the outer weighing point 201 and inner weighing point 202 of the conveying unit in the production line weighing section 13 to lift the roller frame 2, the roller shaft 5, and the potatoes 17 to a certain height. The potatoes are weighed when the four weighing points get in contact with the load cell 20 mounted on the weighing section support guiding rail 21, as shown in FIG. 15 and FIG. 16. In the production line sorting section 14, the electromagnetic toggle assembly 23 is bolted to the frame 25 and arranged along the conveying direction of the production line on both sides of the conveying unit, directly below the sorting toggle bar 203 of the roller frame 2. The electromagnetic toggle assembly 23 can be popped out or retracted by the control system. The flexible roller 22 and the sorting outlet 24 are arranged below the mounting position of each electromagnetic toggle assembly 23, wherein the flexible roller 22 is driven by the flexible roller drive motor 10 to slowly rotate and acts as a buffer during the unloading process of fruits and vegetables. When the conveying unit moves below the production line, the outer roller 1 is in contact with the frame 25 and acts as a support for the conveying unit, as shown in FIG. 17.

When the conveying unit is transported to the loading section and the detecting section by the drive chain 9, the limiting bevel III 704 on the roller frame base 705 of the support base 7 is only in contact with the limit bevel I 205 on the base connection portion 210 of the roller frame 2, so that the roller frame base 705 is limited and stably immobilized vertically in the base connection portion 210 so, wherein the limiting bevel III 704 achieves the limiting function of preventing movement of the roller frame.

When the conveying unit is transported to the weighing section by the drive chain 9, the limit bevel III 704 on the roller frame base 705 of the support base 7 is disengaged from the limit bevel I 205 and the limit bevel II 208 on the base connection portion 210 of the roller frame 2, so the limit bevel III 704 does not achieve the limiting function.

When the conveying unit is transported to the sorting section by the drive chain 9, the roller frame 2 is pushed over by the electromagnetic toggle assembly 23. At this time, the roller frame 2 is in the overturned position, and the limit bevel III 704 on the roller frame base 705 of the support base 7 is only in contact with the limit bevel II 208 on the base connection portion 210 of the roller frame 2, so that the roller frame base 705 is tilted and mounted in the base connection portion 210 in a limited and stable manner, wherein the limiting bevel III 704 achieves the limiting function of preventing movement of the roller frame.

In the four working areas including the production line loading section 11, the production line detecting section 12, the production line weighing section 13, the production line sorting section 14, both sides of the drive chain 9 are always provided with the frame 25.

The detection dark box 18 is set at the production line detecting section 12. The drive chain 9 is provided with detecting section support guiding rail 19 on both sides. The detecting section support guiding rail 19 is fixed to the frame 25. The detecting section support guiding rail 19 is provided with transition ramps along the front and rear ends of the drive chain 9. The detecting section support guiding rail 19 on both sides is located under the outer roller 1 connected to two ends of the roller shaft 5. The detecting section support guiding rail 19, the drive chain 9 at the production line detecting section 12 and each conveying unit are located in the detection dark box 18.

At the production line weighing section 13, the drive chain 9 is provided with weighing section support guiding rail 21 on both sides. The weighing section support guiding rail 21 is fixed to the frame 25. The weighing section support guiding rail 21 is provided with transition ramps along the front and rear ends of the drive chain 9. The weighing section support guiding rail 21 on both sides is located below the weighing points on both sides of the roller frame 2. The weighing section support guiding rail 21 is located above the sorting toggle bar 203. The weighing section support guiding rail 21 is provided with the load cell 20. The load cell 20 works in contact with the weighing points of the roller frame 2 in the conveying unit.

At the production line sorting section 14, the drive chain 9 is provided with the electromagnetic toggle assembly 23 on both sides. The electromagnetic toggle assembly 23 makes contact with the sorting toggle bar 203 and used to push the sorting toggle bar 203. The drive chain 9 is provided with the flexible roller 22 and the sorting outlet 24. The sorting outlet 24 is located below the flexible roller 22. The flexible roller 22 is coaxially connected to the flexible roller drive motor 10. The flexible roller drive motor 10 drives the flexible roller 22 to rotate. The flexible roller 22 receives the fruits and vegetables 17 falling from the side of the drive chain 9 and then the flexible roller 22 rotates and buffers the impact of fruits and vegetables on their way to the sorting outlet 24.

The load cells 20 are rectangular-shaped sensors arranged along the weighing section support guiding rail 21. In this embodiment, the spacing between the two outer weighing points 201 is greater than the spacing between the two inner weighing points 202. The load cells 20 are arranged in a zigzagged pattern. The spacing of the load cells 20 arranged on both sides of the weighing section support rail 21 at the outer weighing point 201 is equal to the spacing between the two outer weighing points 201. The spacing of the load cells 20 arranged on both sides of the weighing section support rail 21 at the inner weighing point 202 is equal to the spacing between the two inner weighing points 202.

When the conveying unit is transported by the drive chain 9 to the production line loading section 11, as shown in FIG. 13, two pin shafts 3 on the base connection portion 210 of the roller frame 2 are located in the bottom outer point 7024 and the limit protrusion 703 is embedded in the limit slot 207.

When the conveying unit is transported to the production line detecting section 12 by the drive chain 9, as shown in FIG. 14, the two outer rollers 1 at both ends of the roller shaft 5 are supported and lifted by the detecting section support guiding rail 19. The roller shaft 5 moves up along the roller shaft sliding slot 209. The two pin shafts 3 on the base connection portion 210 of the roller frame 2 are still at the bottom outer point 7024. The roller shaft 5 is rolled by friction on the surface of the detecting section support guiding rail 19, and then driven by the outer roller 1 and the rubber bushing 4 sleeved on the central roller 501 of the roller shaft 5 to rotate with the fruits and vegetables. The fruits and vegetables are detected through the camera or the spectral detection probe arranged in the detection dark box 18. At the detecting section, only the roller shaft 5 is lifted in the roller shaft sliding slot 209, the position of the roller frame 2 remains unchanged. 703 is still in contact with 207. The fruits and vegetables are supported and driven to rotate by the outer roller 1 and the central roller 501 of the adjacent two roller-type conveying units, so the fruits and vegetables are not in contact with the support claws at this time.

When the conveying unit is transported by the drive chain 9 to the production line weighing section 13, the roller shaft 5 does not elevate in the roller shaft sliding slot 209, but elevates in the roller shaft sliding slot 209 along with the roller frame 2 rising, as shown in FIG. 15 and FIG. 16. The weighing points at the four corners of the roller frame 2 are supported and lifted by the weighing section support guiding rail 21. The limit protrusion 703 is detached from the limit slot 207. The two pin shafts 3 on the base connection portion 210 of the roller frame 2 are symmetrically arranged at this time between the top outer point 7021 and the bottom outer point 7024. The roller shaft 5 and the weighing section support guiding rail 21 are spaced without contact with each other. The roller frame 2 is arranged without contact with the support base 7. The load cell 20 on the weighing section support guiding rail 21 weighs the overall weight of the roller frame 2, the roller shaft 5 and the fruits and vegetables thereon. The weight of the fruits and vegetables is obtained by subtracting the weight of the roller frame 2 and the roller shaft 5 from the overall weight.

When the conveying unit is transported to the production line sorting section 14 by the drive chain 9, as shown in FIG. 17, the electromagnetic toggle assembly 23 pushes the sorting toggle bar 203 on the bottom side of the roller frame 2 to move upward. The limit protrusion 703 is detached from the limit slot 207 and drives the roller frame 2 to turn to one side. One of two pin shafts 3 on the base connection portion 210 of the roller frame 2 is located in the top inner point 7022 and the other one is located in the bottom outer point 7024. The fruits and vegetables 17 fall from the support claw 206 of the roller frame 2 to the rotating flexible roller 22, and then are rotated, guided and transferred to the sorting outlet 24 by the flexible roller 22. The impact of the fall is buffered by the flexible roller 22.

Figures 18, 19:
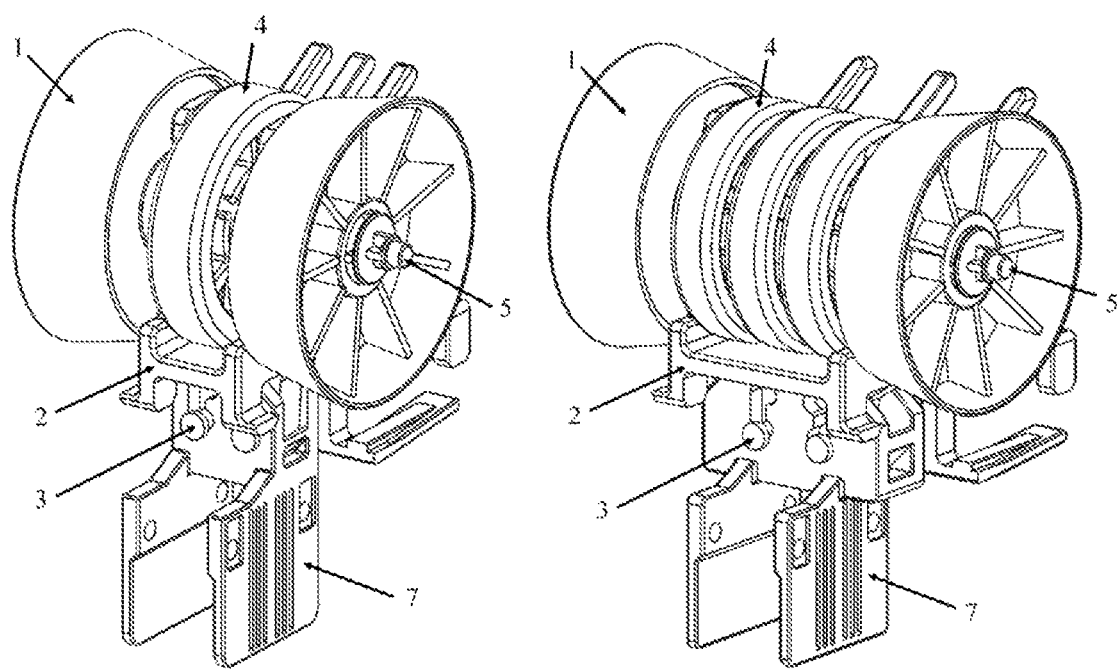
FIG. 18 is an axonometric view of a second embodiment of the present invention.
FIG. 19 is an axonometric view of a third embodiment of the present invention.

In another embodiment of the present invention, the width of the conveying unit is variable by increasing or decreasing the width of the parts such as the roller frame 2, the roller shaft 5, the support base 7. The number of the central roller 501 of the roller shaft 5 may be adjusted so that the conveying unit can accommodate different sizes of fruits and vegetables, as shown in FIG. 18 and FIG. 19.

The complete operation process in the embodiment is as follows:

Potatoes are used as the fruits and vegetables 17 in this embodiment.

As shown in FIG. 13, the potatoes 17 are loaded in production line loading section 11. The potatoes 17 are supported by the outer roller 1, the central roller 501, and the support claw 206 of the same conveying unit. At this time, the conveying unit is in the initial position, as shown in FIG. 8. Under the action of their own gravity, the rotating shaft 503 is located at the lowest position of the roller shaft sliding slot 209, and the pin shafts 3 on both sides are located at the lowest position of the pin shaft sliding slot 702, overlapping with the bottom outer point 7024 of the bar-shaped slot. The limit bevel I 205 is in contact with the limit bevel III 704, and the limit protrusion 703 is fixed in the limit slot 207. These parts fitting together play a limiting role, to prevent the roller frame 2 and the potatoes 17 from tipping over, thereby ensuring a stable operation of the conveying process.

Subsequently, the conveying unit carries the potatoes 17 into the production line detecting section 12 through the sloping structure at one end of the detecting section support guiding rail 19, as shown in FIG. 14. At this time, the detecting section support guiding rail 19 gets into contact with the outer roller 1. The outer roller 1 is lifted to a certain height, and drives the rotating shaft 503 to move upward in the roller shaft sliding slot 209. Then, the outer roller 1 and the roller shaft 5 are collectively lifted up, while the position of the roller frame 2 remains unchanged. In this case, the potatoes 17 are supported by the outer roller 1 and the central roller 501 of the adjacent conveying units, but the potatoes 17 do not contact with the support claw 206. As the drive chain 9 moves forward, the friction between the outer roller 1 and the detecting section support guiding rail 19 enables the outer roller 1 and the roller shaft 5 continuously rotate forward collectively, thus driving the potatoes 17 to rotate. When the potatoes 17 pass through the detection dark box 18 in which the camera or the spectral detection probe position is arranged, the potatoes 17 are subjected to all-around non-destructive tests such as machine vision or spectral acquisition. When the outer roller 1 descends from the slope on the other end of the detecting section support guiding rail 19, the potatoes 17 descend with the outer roller 1, and then the potatoes 17 are supported again by the outer roller 1, the central roller 501, and the support claw 206 of the same conveying unit.

The conveying unit then carries the potatoes 17 from the sloping structure at one end of the weighing section support guiding rail 21 to the production line weighing section 13, as shown in FIG. 15. At this time, the weighing section support guiding rail 21 is in contact with the two outer weighing points 201 and the two inner weighing points 202, and raises the outer roller 1 to synchronously lift the roller shaft 5, the roller frame 2, the rubber bushing 4, and the potatoes 17 placed thereon to a certain height. The pin shafts 3 on both sides move vertically upward a certain distance in the pin shaft sliding slot 702 together with the roller frame 2 lifted. At this time, the roller frame 2 is detached from the support base 7 below the roller frame 2. When the outer weighing point 201 and inner weighing point 202 move to the load cell 20, the weighing process is completed. The weight of the potatoes 17 is calculated by subtracting the weight of the outer rollers 1, the roller shaft 5, the roller frame 2, and the rubber bushings 4 from the obtained weight value. As shown in FIG. 16, the load cell 20 has a zigzagged pattern, with the distance between the two sides being wide at the front and narrow at the back. The width of the load cell 20 is matched with the inner and outer weighing points, so that only four weighing points of one conveying unit are in contact with the load cell 20 at any given moment. As the inner and outer weighing points descend from the slope on the other end of the weighing section support guiding rail 21, the conveying unit returns to its initial position.

Finally, the potatoes 17 enter the production line sorting section 14 with the movement of the conveying unit, as shown in FIG. 17. According to the non-destructive test results obtained from the production line detecting section 12 and the weighing values obtained from the production line weighing section 13, the corresponding sorting outlet 24 for the potatoes 17 is determined by a computer, and the electromagnetic toggle assembly 23 at the corresponding position controlled by the control system pops up and toggles upward the sorting toggle bar 203 of the conveying unit on one side, so that the roller frame 2 and roller shaft 5 tilt upward and to the other side. At this time, the limit slot 207 is detached from the limit protrusion 703, and the limit bevel III 704 is detached from the limit bevel I 205, so that all of them lose the limiting effect. In addition, under the action of the vertical upward pushing force of the electromagnetic toggle assembly 203, the pin shaft 3 near the side of the electromagnetic toggle assembly 23 moves vertically upward in the pin shaft sliding slot 702. The pin shaft 3 on the other side is pulled upward along the side because the distance between the pin shafts 3 on both sides is fixed. When the pin shaft 3 moving vertically upward reaches the top outer point 7021 of the bar-shaped slot, the pin shaft 3 on the other side enters the bottom inner point 7023 precisely as shown in FIG. 9. Under the limiting action of the top outer point 7021 and the bottom inner point 7023, due to continuous pushing of the electromagnetic toggle assembly 23 and gravity, the pin shaft 3 near the electromagnetic toggle assembly 23 moves horizontally into the top inner point 7022, and the pin shaft 3 on the other side is pulled back down to the initial bottom outer point 7024 of the bar-shaped slot, as shown in FIG. 10. At this time, the limit bevel II 208 gets into contact with the limit bevel III 704, and the pin shafts 3 on both sides enter the top inner point 7022 and the bottom outer point 7024 respectively, so that the two parts together achieve a limiting function to keep the conveying unit in the completed sorting state. The potatoes 17 tilted by the conveying unit first fall to the rotating flexible roller 22 to buffer the impact of falling, and finally drop to the corresponding sorting outlet 24 to complete the sorting process. Because the overall structure of the conveying unit is symmetrical, the sorting process to be operated on the other side is the same as the above steps, thereby achieving the two-sided sorting process.

Figure 11:
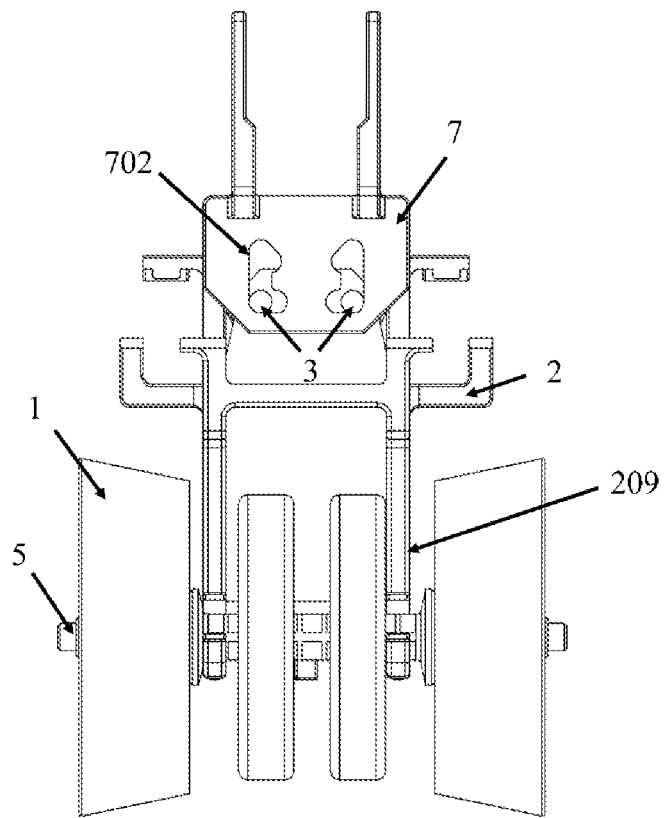
FIG. 11 is a schematic diagram showing the reset process of the conveying unit at the end of unloading.

After the sorting process is completed, the conveying unit moves with the drive chain 9 to the bottom of the production line. At this time, the conveying unit is in a reverse state, as shown in FIG. 11. Because of the effects of their weight and gravity, the outer roller 1 and roller shaft 5 fall to the lowest position in the reversed roller shaft sliding slot 209, and the pin shaft 3 falls vertically to the top outer point 7021 of the bar-shaped slot. Because the distance between the pin shafts 3 on two sides is fixed, the pin shaft 3 previously in the bottom outer point 7024 of the bar-shaped slot is pulled to move to the top outer point 7021. At this time, the whole conveying unit is in a vertical state, and the frame 25 contacts and supports the outer roll 1, as shown in FIG. 17. As the drive chain 9 continues to move to the production line loading section 11, the conveying unit reverses again. Also because of their own weight and gravity, the outer roller 1 and the roller shaft 5 fall to the lowest position in the roller shaft sliding slot 209, and the pin shafts 3 on both sides simultaneously fall vertically to the bottom outer point 7024 of the bar-shaped slot of the pin shaft sliding slot 702, and the conveying unit returns to the initial loading state, as shown in FIG. 8.

The above specific embodiments are used to explain and illustrate the present invention, rather than limiting the present invention. Any modifications and changes made to the present invention shall be included in the scope of protection of the present invention.

What is claimed is:

1. A roller-type conveying device for fruit and vegetable sorting, comprising a chain assembly, and conveying units, wherein fruits and vegetables are placed on the conveying units;

the chain assembly comprises a drive chain and a chain support bar;

the drive chain is arranged on the chain support bar;

the conveying units are arranged along with each chain link of the drive chain;

each conveying unit comprises outer rollers, roller frames, pin shafts, rubber bushings, a roller shaft, and a support base;

the two outer rollers are fixed coaxially set two ends of the roller shaft, and the roller shaft is equipped with the rubber bushings;

the roller shaft is movably set in a special-shaped hole slot at a top of the roller frame;

the roller shaft is arranged axially perpendicular to a transmission direction of the drive chain;

a bottom of the roller frame is movably connected to a top of the support base through the pin shaft and the special-shaped hole slot;

the support base is mounted on the drive chain;

the main body of the roller frame is a U-shaped frame comprising a bottom plate located in the middle and vertical plates connected on two sides of the bottom plate;

the vertical plates on the two sides are provided with roller shaft sliding slots on an upper side along the transmission direction of the drive chain;

the roller shaft sliding slots are vertical kidney-shaped slots along a length direction;

the roller shaft is movably mounted and moves up and down in the two roller shaft sliding slots arranged in the vertical plates on the two sides;

a support claw is connected between the two vertical plates along with a lower side of the moving direction of the drive chain;

the support claw is arranged obliquely upward from a middle of the vertical plates in the transmission direction of the drive chain;

the fruits and vegetables are placed in a recessed portion formed between the support claw and the vertical plates;

the fruits and vegetables are supported by the support claw and a middle of the roller shaft;

a bottom surface of the bottom plate of the roller frame is fixed with the rectangular base connection portion;

the rectangular base connection portion is provided with the two pin shaft mounting holes, wherein the two pin shaft mounting holes are symmetrical and each pin shaft is mounted in each pin shaft mounting hole;

the support base comprises two parts: a chain base located in a lower part and a roller frame base located in an upper part; the chain base is connected to the drive chain;

the roller frame base comprises two side plates arranged oppositely along the transmission direction of the drive chain;

a pin shaft sliding slot set is set on one side of the two side plates, and another pin shaft sliding slot set is set on the other side of the two side plates, wherein each pin shaft sliding slot set comprises two pin shaft sliding slots, and the two pin shaft sliding slots are special-shaped and located on the two side plates respectively and along with the same transmission direction of the drive chain;

the two pin shaft sliding slots on each side plate are symmetrically arranged;

a rectangular mounting slot is formed between the two side plates roller frame base, and the rectangular base connection portion is embedded in the rectangular mounting slot; each pin shaft inside the two pin shaft mounting holes on the rectangular base connection portion passes through one pin shaft sliding slot set;

the pin shaft passes through two pin shaft sliding slots in the pin shaft sliding slot sets, so that the bottom of the roller frame is movably connected to the top of the support base, and then the roller frame and the support base are adjusted to form different postures to achieve different working states;

two sides of the rectangular base connection portion of the roller frame are symmetrically provided with two limit bevels having chamfered structures, and each of the two limit bevels on each side comprises a first limit bevel and a second limit bevel arranged from bottom to top;

a bottom of the rectangular mounting slot between the two side plates of the roller frame base is equipped with a third limit bevel, and the third limit bevel tilts upward and outward; and the third limit bevel is configured to cooperate with the first limit bevel and the second limit bevel on the roller frame to achieve a position limiting function.

2. The roller-type conveying device for fruit and vegetable sorting according to claim 1, wherein at least one side plate of the two side plates of the roller frame base protrudes upward in a direction of the drive chain to form the limit protrusion;

the bottom surface of the bottom plate of the roller frame above the limit protrusion is provided with a limit slot; and the limit protrusion is configured to cooperate with the limit slot by embedding the limit protrusion to the limit slot.

3. The roller-type conveying device for fruit and vegetable sorting according to claim 1, wherein weighing points are arranged at four corners of the bottom plate of the roller frame;

the weighing points comprise two outer weighing points and two inner weighing points;

the two outer weighing points are arranged on two sides of the bottom plate of the roller frame, adjacent to the lower side of the transmission direction of the drive chain; and the two inner weighing points are arranged on the two sides of the bottom plate of the roller frame, adjacent to the upper side of the transmission direction of the drive chain.

4. The roller-type conveying device for fruit and vegetable sorting according to claim 1, wherein two outer sides of the bottom plate of the roller frame are provided with a sorting toggle bar, wherein the sorting toggle bar is driven to drive the roller frame to tilt and unload the fruits and vegetables.

5. The roller-type conveying device for fruit and vegetable sorting according to claim 1, wherein the roller shaft comprises central rollers, conical mounting blocks, and a rotating shaft;

the central rollers are fixed coaxially in a middle of the rotating shaft; the central rollers are equipped with the rubber bushings outside;

the conical mounting blocks are coaxially fastened to the two ends of the roller shaft;

the conical mounting blocks are set within conical mounting holes of the outer rollers to form an interference fit; and parts of the rotating shaft on two sides of the central roller are arranged in the two roller shaft sliding slots of the roller frame, and the rotating shaft moves up and down in the roller shaft sliding slots.

6. The roller-type conveying device for fruit and vegetable sorting according to claim 1, wherein a shape of each pin shaft sliding slot is special-shaped;

a main body of each pin shaft sliding slot is a straight bar-shaped slot arranged vertically;

a top of the bar-shaped slot is provided with an upper circular hole on a side adjacent to a center of the side plate;

the top of the bar-shaped slot and the upper circular hole are connected;

a bottom of the bar-shaped slot is provided with a lower circular hole on the side adjacent to the center of the side plate;

the bottom of the bar-shaped slot and the lower circular hole are connected;

a width of the bar-shaped slot, a diameter of the upper circular hole and a diameter of the lower circular hole are identical to a diameter of the pin shaft, the pin shaft is configured to move up and down along the bar-shaped slot, wherein the pin shaft is configured to move to the upper circular hole through the top of the bar-shaped slot, and move to the lower circular hole through the bottom of the bar-shaped slot.

7. The roller-type conveying device for fruit and vegetable sorting according to claim 6, wherein on the same side plate, a distance between centers of circles at the tops of the bar-shaped slots of the pin shaft sliding slots on the two sides, a distance between centers of circles at the bottoms of the bar-shaped slots of the pin shaft sliding slots on the two sides, a distance between a center of a circle of the upper circular hole of the pin shaft sliding slot on a first side and the center of the circle at the bottom of the bar-shaped slot of the pin shaft sliding slot on a second side, and a distance between the center of the circle at the top of the bar-shaped slot of the pin shaft sliding slot on the first side and a center of a circle of the lower circular hole of the pin shaft sliding slot on the second side are identical and equal to a distance between the two pin shaft mounting holes on the rectangular base connection portion.

\* \* \* \* \*